United States Patent
Shi et al.

(10) Patent No.: US 12,100,805 B2
(45) Date of Patent: Sep. 24, 2024

(54) POLYMER ELECTROLYTE FOR LITHIUM ION BATTERY AND POLYMER BATTERY

(71) Applicant: SHENZHEN CAPCHEM TECHNOLOGY CO., LTD., Guangdong (CN)

(72) Inventors: Qiao Shi, Guangdong (CN); Qiujun Wang, Guangdong (CN); Zhongbo Liu, Guangdong (CN)

(73) Assignee: SHENZHEN CAPCHEM TECHNOLOGY CO., LTD., Shenzhen (CN)

( * ) Notice: Subject to any disclaimer, the term of this patent is extended or adjusted under 35 U.S.C. 154(b) by 1001 days.

(21) Appl. No.: 16/978,765

(22) PCT Filed: Jun. 27, 2018

(86) PCT No.: PCT/CN2018/092978
§ 371 (c)(1),
(2) Date: Sep. 7, 2020

(87) PCT Pub. No.: WO2019/178973
PCT Pub. Date: Sep. 26, 2019

(65) Prior Publication Data
US 2021/0050623 A1    Feb. 18, 2021

(30) Foreign Application Priority Data
Mar. 19, 2018  (CN) .......................... 201810223318.4

(51) Int. Cl.
| H01M 10/0565 | (2010.01) |
| H01M 4/02 | (2006.01) |
| H01M 4/38 | (2006.01) |
| H01M 4/505 | (2010.01) |
| H01M 4/525 | (2010.01) |
| H01M 4/583 | (2010.01) |
| H01M 10/0525 | (2010.01) |

(52) U.S. Cl.
CPC ....... *H01M 10/0565* (2013.01); *H01M 4/382* (2013.01); *H01M 4/386* (2013.01); *H01M 4/505* (2013.01); *H01M 4/525* (2013.01); *H01M 4/583* (2013.01); *H01M 10/0525* (2013.01); *H01M 2004/027* (2013.01); *H01M 2004/028* (2013.01); *H01M 2300/0082* (2013.01)

(58) Field of Classification Search
CPC .................. H01M 10/0565; H01M 2300/0082
See application file for complete search history.

(56) References Cited

U.S. PATENT DOCUMENTS

| 4,578,326 A | 3/1986 | Armand et al. | |
| 6,642,294 B1 | 11/2003 | Bauer et al. | |
| 6,645,675 B1* | 11/2003 | Munshi | H01M 4/0404 |
| | | | 429/234 |
| 2005/0019667 A1 | 1/2005 | Oh et al. | |
| 2008/0044731 A1* | 2/2008 | Nishio | C08G 65/12 |
| | | | 429/317 |
| 2016/0028113 A1* | 1/2016 | Jeon | H01M 10/0565 |
| | | | 429/303 |
| 2017/0294678 A1 | 10/2017 | Lee et al. | |
| 2019/0157711 A1* | 5/2019 | Makino | H01B 1/06 |

FOREIGN PATENT DOCUMENTS

| CN | 103500845 A | 1/2014 | |
| CN | 105206872 A | 12/2015 | |
| JP | H10130487 A | 5/1998 | |
| WO | WO-2018021503 A1 * | 2/2018 | ............... H01B 1/06 |

OTHER PUBLICATIONS

International Search Report of PCT Patent Application No. PCT/CN2018/092978 issued on Nov. 30, 2018.
Zhusheng Chen et al., Polymer Fast Ion Conductor Synthesis and Electrical Properties Research, Journal of Yantai University (Natural Science and Engineering) No. 3 1992, Mar. 31, 1992, pp. 22-28.

\* cited by examiner

*Primary Examiner* — Basia A Ridley
*Assistant Examiner* — Heng M. Chan

(57) ABSTRACT

Provided is a polymer electrolyte for lithium ion battery and a polymer battery, comprising polyether polymer and lithium salt, wherein the molar ratio of lithium ions in the lithium salt to oxygen atoms in ether bonds of the polyether polymer is more than 1/4; the polyether polymer comprises polymer of Formula 1: $A\text{-}R_n$;

A is a hydrocarbyl group or an oxygen-containing hydrocarbyl group, n is an integer, and $n \geq 1$;
R is

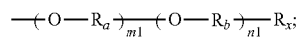

$R_a$ and $R_b$ are selected from alkylene, and $R_x$ is selected from organic functional groups and halogen; m1 is a natural number greater than 0, n1 is a natural number, and when n1 is 0, $n \geq 3$. Preferably, the ratio of the total number of carbon atoms in all repeating units of the polyether polymer to the total number of repeating units is over 4; More preferably, the polyether polymer has a branched structure.

8 Claims, No Drawings

POLYMER ELECTROLYTE FOR LITHIUM ION BATTERY AND POLYMER BATTERY

TECHNICAL FIELD

The application relates to a polymer electrolyte for lithium ion battery and a polymer battery using that polymer electrolyte, in particular to a polymer electrolyte for solid-state lithium ion battery and a solid-state lithium ion battery.

BACKGROUND

Lithium ion batteries have been widely used in electronic and electrical fields such as mobile phones and notebook computers because of their high energy density, high working voltage, no memory effect, long cycle life and environmental friendliness. At present, electronic digital products, electric vehicles and large-scale energy storage devices have higher requirements for energy density. Lithium ion batteries using commercial liquid electrolyte are difficult to meet the requirements. On the one hand, the liquid electrolyte will undergo serious decomposition reaction on the surface of electrode materials under high temperature and high pressure, which leads to the deterioration of battery performances; on the other hand, the low flash point solvent used in the liquid electrolyte has poor safety when temperature rises. Although the gel electrolyte formed by polymer and organic liquid electrolyte can prevent the liquid from flowing, thus eliminating the potential safety hazard caused by battery leakage to a certain extent, it cannot meet the requirements of safety and high energy density.

On the other hand, using solid-state polymer electrolyte can fundamentally improve the safety of batteries. However, compared with liquid electrolyte, the ionic conductivity of solid-state polymer electrolyte is poor. In addition, in the prior art, polymer electrolytes with high ionic conductivity are using polyether polymers as matrix, such as polyethylene oxide (PEO), but the poor oxidation resistance of polyether polymers leads to low working voltage of batteries, and usually lithium iron phosphate has to be selected as the positive active material, resulting in low energy density of batteries. Therefore, it is urgent to develop a polymer electrolyte with high working voltage, suitable for high voltage positive electrodes and high conductivity, such as lithium cobaltate or lithium nickel cobalt manganate.

SUMMARY

Aiming at the problems of low working voltage and low conductivity of polymer electrolyte in the prior art, the invention provides a novel polymer electrolyte with high working voltage and high conductivity.

The technical solution is as follows:

The invention provides a polymer electrolyte for lithium ion battery, comprising a polyether polymer and a lithium salt; in the polymer electrolyte, the molar ratio of lithium ions in the lithium salt to oxygen atoms in ether bonds of the polyether polymer is more than 1/4; the polyether polymer comprises a polymer represented by formula 1:

A-R$_n$;  Formula 1:

Wherein, A is a hydrocarbyl group or an oxygen-containing hydrocarbyl group, n is an integer and n≥1; R is

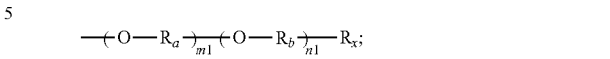

R$_a$ and R$_b$ are independently selected from alkylene, and R$_x$ is selected from organic functional groups or halogen; m1 is a natural number greater than 0, n1 is a natural number, and when n1 is 0, n≥3; and the number of carbon atoms in R$_a$ is a', the number of carbon atoms in R$_b$ is b', (a'*m+b'*n)/(m1+n1)≤4.

Meanwhile, the application also provides a polymer battery, comprising a positive electrode, a negative electrode and a polymer electrolyte between the positive electrode and the negative electrode, wherein the polymer electrolyte is the polymer electrolyte described above.

From the perspective of polymer matrix, the ether oxygen functional group of polyether polymer itself has strong complexing ability for lithium ion. When the molar ratio of lithium ion in lithium salt to ether bond oxygen atom in polyether polymer is less than 1/4, lithium ion needs to rely on the polyether polymer segment motion to realize lithium ion conduction. However, under the condition of high voltage, the ether-oxygen bond is easily oxidized, which leads to insufficient oxidation resistance of polymer electrolyte using polyether polymer as matrix. The difficulty to use it in high voltage positive electrode still exists. And it is not suitable for high voltage positive electrodes such as lithium cobaltate and lithium nickel cobalt manganate. However, when the molar ratio of lithium ion in lithium salt to oxygen atom of ether bond in polyether polymer reaches more than 1/4, on the one hand, the ether oxygen functional group will complex a large amount of lithium ion and reach saturation state, which will greatly improve its oxidation resistance. And it is less likely to be oxidized under high voltage, and the oxidation resistance potential of the polymer electrolyte is improved. On the other hand, when the ether-oxygen functional group in polyether polymer complexes with lithium and reaches saturation state, a large number of free lithium ions in the form of ion clusters were dispersed in the polymer electrolyte, forming many lithium ion transmission channels independent of the motion of chain segments, thus greatly improving the conductivity of polymer electrolyte, reaching $10^{-3}$ orders of magnitude.

Furthermore, through a large number of experiments, the inventors of the present invention found that the number of carbon atoms in the repeating units of polyether polymers also has an important influence on the conductivity of polymer electrolytes. Generally speaking, the larger the average number of carbon atoms in the repeating units of polyether polymers (the ratio of the total number of carbon atoms in all repeating units to the total number of the repeating units), the lower the conductivity of polymer electrolytes. The reason is that with the increase of the average number of carbon atoms in the repeating units of polyether polymers, the proportion of ether-oxygen functional groups in polyether polymers decreases, and the possibility of complexing with lithium ions to form ion transmission channels decreases, resulting in the decrease of ion transmission channels.

Furthermore, the inventors of the present invention found that the conductivity of the polymer electrolyte obtained by using the homopolymer of polyether is not high enough, because the homopolymer of polyether is easy to crystallize, resulting in many polymer crystalline phases in the polymer electrolyte, which hinders the transmission of lithium ions. According to a large number of experiments, the inventor of the present invention found that by adopting the copolymer of polyether with two different structural units and/or polyether polymer with branched structure, the crystallization of polymer can be effectively inhibited, which is more conducive to the formation of ion transmission channels, so as to obtain polymer electrolyte with higher conductivity.

Furthermore, through a large number of experiments, the inventor of the present invention found that the introduction of unsaturated functional groups such as allyl, acrylate, methacrylate, etc. into the terminal groups of polyether polymers can cause polymerization reaction under the action of initiators such as azobisisobutyronitrile (AIBN) and benzoyl peroxide (BPO) to form comb-like or network-like structures, which can inhibit crystallization and improve mechanical properties. The polyether polymers with comb-like or network-like structures described above have higher electrical conductivity and better mechanical properties.

Furthermore, through a large number of experiments, the inventor of the present invention found that introducing inorganic filler into the above-described polymer electrolyte can further improve the conductivity and mechanical properties of the polymer electrolyte. The inorganic filler comprises one or more of $SiO_2$, $Al_2O_3$, $TiO_2$, $ZrO_2$, MgO, $Li_7La_3Zr_2O_{12}$, $Li_{6.4}La_3Zr_{1.4}Ta_{0.6}O_{12}$, $Li_{10}GeP_2S_{12}$, $Li_{1.3}Al_{0.3}Ti_{1.7}(PO_4)_3$, $Li_{2.88}PO_{3.73}N_{0.14}$, montmorillonite, kaolin and diatomite. These inorganic fillers can improve the conductivity and mechanical properties of the polymer electrolyte for the following reasons: Firstly, these inorganic fillers can inhibit the crystallization of polyether, which is beneficial to improve the conductivity. Secondly, some inorganic fillers, such as $Al_2O_3$ (a type of lewis acids), have a certain binding force with anions in lithium salt, which is beneficial to the dissociation of lithium salt and increase the transference number of lithium ions, thus helping the transmission of lithium ions. Thirdly, inorganic fillers such as $Li_7La_3Zr_2O_{12}$ have high ionic conductivity, which is beneficial to form a better ion transmission channel. Finally, after being compounded with inorganic fillers, the mechanical properties of the polymer electrolyte will be significantly improved.

DETAILED DESCRIPTION OF DISCLOSED EMBODIMENTS

In order to make the technical problems to be solved, technical solutions and beneficial effects more apparent and clearer, the present application will be described in further detail below with reference to embodiments. It should be understood that the specific embodiments described herein are only for the purpose of explaining the present application and are not intended to limit the present application.

The polymer electrolyte for lithium ion battery provided by the application comprising a polyether polymer and a lithium salt; in the polymer electrolyte, the molar ratio of lithium ions in the lithium salt to oxygen atoms in ether bonds of the polyether polymer is more than 1/4; the polyether polymer comprises a polymer represented by formula 1:

A-R$_n$;                                   Formula 1:

Wherein, A is a hydrocarbyl group or an oxygen-containing hydrocarbyl group, n is an integer and n≥1; R is

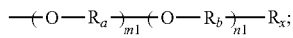

$R_a$ and $R_b$ are independently selected from alkylene, and $R_x$ is selected from organic functional groups or halogen; m1 is a natural number greater than 0, n1 is a natural number, and when n1 is 0, n≥3; and the number of carbon atoms in $R_a$ is a', the number of carbon atoms in $R_b$ is b', (a'*m1+b'*n1)/(m1+n1)≤4. Preferably, $R_x$ is selected from one of hydroxyl, oxygen-containing hydrocarbyl group, ester group or hydrocarbyl group containing unsaturated bond.

When the molar ratio of lithium ion in the lithium salt to ether bond oxygen atom in the polyether polymer is more than 1/4, one part of the lithium ion is complexed with ether oxygen functional group, the other part exists in the form of ion cluster, and high concentration of lithium ion is beneficial to form many lithium ion transmission channels independent of segment motion, thus greatly improving the conductivity of polymer electrolyte. Preferably, in the polymer electrolyte, the molar ratio of lithium ions in the lithium salt to ether bond oxygen atoms in the polyether polymer is 1/4-1/1. When the molar ratio of lithium ion in lithium salt to ether bond oxygen atoms in polyether polymer is too high, the lithium salt will precipitate in the polyether polymer, resulting in phase separation, deteriorating the performance of polymer electrolyte.

As it is known, polyether polymer is a high molecular polymer containing ether-oxygen functional groups as repeating units, and its main composition is repeating units, and the weight ratio of other atoms or functional groups is very low, which could be negligible. In the present application, the ratio of the polyether polymer weight to the molecular weight of repeating units of ether oxygen functional groups is taken as the molar number of ether oxygen functional groups in the polyether polymer. It can be understood that when the polyether polymers are copolymers with different repeating units, the average molecular weight of repeating units is calculated according to the weight ratio of each repeating unit, and then the molar number of ether oxygen functional groups is calculated according to the weight of polyether polymers and the above-mentioned average molecular weight.

In the present application, preferably, the weight-average molecular weight of the polyether polymer is ≥1000.

In the present application, preferably, in the polyether polymer, the ratio of the total number of carbon atoms in all repeating units to the total number of repeating units is 4 or less (that is, the average number of carbon atoms in repeating units is 4 or less). When the average number of carbon atoms in the repeating unit of polyether polymer is greater than 4, the density of ether oxygen functional group is low, which is not conducive to the formation of ion transmission channel, thus reducing the conductivity of polymer electrolyte.

The R can be selected from one or more of homopolymer or copolymer of polyoxymethylene, polyacetaldehyde, polyethylene glycol, polypropylene glycol, polyethylene oxide, polypropylene oxide and polytetrahydrofuran. Preferably, the above formula 1 is a branched structure, and n≥3. Specifically, the polyether polymer is selected from one or more of the following structural formulas:

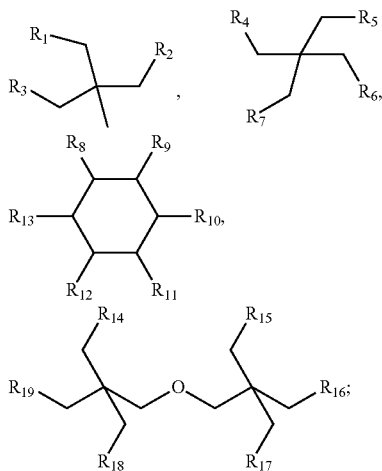

wherein, $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$ and $R_{17}$ are independently selected from

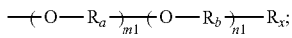

$R_a$ and $R_b$ are independently selected from alkylene, and $R_x$ is selected from one of hydroxyl, oxygen-containing hydrocarbyl group, ester group or hydrocarbyl group containing unsaturated bonds; m1 is a natural number greater than 0, n1 is a natural number, and when n1 is 0, n≥3;

and the number of carbon atoms in $R_a$ is a', the number of carbon atoms in $R_b$ is b', (a'*m1+b'*n1)/(m1+n1)≤4.

When the polyether polymer has the above structure, the whole polyether polymer show a branched structure, and a large number of ether-oxygen functional groups extend outward, which facilitates the transmission of lithium ions, thus being very beneficial to further improve the conductivity. In addition, the branched structure is beneficial to inhibit the crystallization of polyether polymer, to maintain the lithium ion transmission channel based on segment motion, and to further improve the conductivity.

In the above group r, $R_a$ and $R_b$ are independently selected from alkylene, and $R_x$ is selected from organic functional groups or halogen. Wherein, the organic functional groups can be selected from hydroxyl, oxygen-containing hydrocarbyl group, ester group or hydrocarbyl group containing unsaturated bonds. Preferably, $R_x$ is selected from hydrocarbyl groups containing unsaturated bonds, and the hydrocarbyl groups containing unsaturated bonds introduced at the terminal groups of polyether polymers can undergo polymerization reaction to form comb-like or network-like structures (for example, adding BPO initiator to initiate cross-linking reaction), which is beneficial to inhibiting the crystallization of polymer and improving the mechanical properties of polymer electrolyte.

Specifically, $R_x$ is selected from one of the following structural formulas:

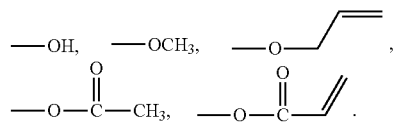

When the number of repeating units of ether-oxygen functional group is too small, it is not conducive to the effective transfer of charge, which leads to the decrease of conductivity. In the present application, preferably, the weight-average molecular weight of the polyether polymer is ≥1000. In this state, the number of repeating units of ether oxygen functional group reaches a certain value, which is very beneficial to further improve the conductivity.

Examples of the above polyether polymers are shown in Table 1 below.

TABLE 1

| Polyether Compound | Structural Formula A | n | Ra | $R_b$ | Ra/$R_b$ | $R_x$ |
|---|---|---|---|---|---|---|
| Polymer-1 | | 4 | —CH$_2$—CH$_2$— | | | —OCH$_3$ |
| Polymer-2 | | 4 | —CH$_2$— | —CH$_2$—CH(CH$_3$)— | 5:5 | —OCH$_3$ |
| Polymer-3 | | 4 | | —CH$_2$—CH(CH$_3$)— | | —OH |
| Polymer-4 | | 4 | —(CH$_2$)$_5$— | | | —OCH$_3$ |
| Polymer-5 | | 4 | —CH$_2$—CH$_2$— | —CH$_2$—CH(CH$_3$)— | 8:2 | —OCH$_3$ |

TABLE 1-continued

| Polyether Compound | Structural Formula A | n | Ra | Rb | Ra/Rb | Rx |
|---|---|---|---|---|---|---|
| Polymer-6 | | 4 | —CH$_2$—CH$_2$— | —CH$_2$—CH(CH$_3$)— | 2:8 | —OCH$_3$ |
| Polymer-7 | | 4 | —CH$_2$—CH$_2$— | —CH$_2$—CH(CH$_3$)— | 8:2 | —O—C(=O)—CH=CH$_2$ |
| Polymer-8 | | 4 | | —CH$_2$—CH(CH$_3$)— | | —O—C(=O)—CH$_3$ |
| Polymer-9 | (cyclohexane with 6 wavy bonds) | 6 | —CH$_2$—CH$_2$— | | | —OH |
| Polymer-10 | | 6 | —CH$_2$— | —CH$_2$—CH(CH$_3$)— | 5:5 | —OCH$_3$ |
| Polymer-11 | | 6 | | —CH$_2$—CH(CH$_3$)— | | —OH |
| Polymer-12 | | 6 | —CH$_2$—CH$_2$— | —CH$_2$—CH(CH$_3$)— | 8:2 | —OCH$_3$ |
| Polymer-13 | | 6 | —CH$_2$—CH$_2$— | —CH$_2$—CH(CH$_3$)— | 8:2 | —O—C(=O)—CH=CH$_2$ |
| Polymer-14 | | 6 | —CH$_2$—CH$_2$— | | | —O—C(=O)—CH$_3$ |
| Polymer-15 | (quaternary carbon with 4 wavy bonds and CH$_3$) | 3 | —CH$_2$—CH$_2$— | | | —OH |
| Polymer-16 | | 3 | —CH$_2$— | —CH$_2$—CH(CH$_3$)— | 5:5 | —OCH$_3$ |
| Polymer-17 | | 3 | | —CH$_2$—CH(CH$_3$)— | | —OH |
| Polymer-18 | | 3 | —CH$_2$—CH$_2$— | —CH$_2$—CH(CH$_3$)— | 8:2 | —OCH$_3$ |
| Polymer-19 | | 3 | —CH$_2$—CH$_2$— | —CH$_2$—CH(CH$_3$)— | 8:2 | —O—C(=O)—CH=CH$_2$ |
| Polymer-20 | | 3 | —CH$_2$—CH$_2$— | | | —O—C(=O)—CH$_3$ |
| Polymer-21 | CH$_3$CH$_2$∼∼∼ | 1 | —CH$_2$—CH$_2$— | —CH(CH$_3$)— | 8:2 | —OH |

TABLE 1-continued

| Polyether Compound | Structural Formula A | n | $R_a$ | $R_b$ | $R_a/R_b$ | $R_x$ |
|---|---|---|---|---|---|---|
| Polymer-22 | | 1 | —$CH_2$— | —$CH_2$—$CH(CH_3)$— | 5:5 | —$OCH_3$ |
| Polymer-23 | | 1 | —$CH_2$—$CH_2$— | —$CH_2$—$CH(CH_3)$— | 8:2 | —$OCH_3$ |
| Polymer-24 | | 1 | —$CH_2$—$CH_2$— | —$CH_2$—$CH(CH_3)$— | 8:2 | —O—C(=O)— |
| Polymer-25 | (structure) | 6 | —$CH_2$— | | | —OH |
| Polymer-26 | | 6 | —$CH_2$— | —$CH(CH_3)$— | 5:5 | —$OCH_3$ |
| Polymer-27 | | 6 | —$CH_2$—$CH_2$— | —$CH_2$—$CH(CH_3)$— | 8:2 | —$OCH_3$ |
| Polymer-28 | | 6 | —$CH_2$— | | | —O—C(=O)— |

The above polyether polymers can be synthesized by conventional synthetic methods in the field of chemistry, for example, polyols can be used to initiate copolymerization of monomers represented by $R_a$ and $R_b$, and finally end-capping. The synthesis methods are known by the skilled person according to the specific compound structures provided by the present application, which will not be detailed.

The lithium salt used in the present invention is not particularly limited and may be those commonly used in the art, for example, the lithium salt is selected from one or more of $LiN(SO_2CF_3)_2$, $LiN(SO_2F)_2$, $LiPF_6$, $LiBF_4$, LiBOB, LiDFOB and $LiCF_3SO_3$.

According to the present invention, preferably, the polymer electrolyte further comprises inorganic filler, comprising one or more of $SiO_2$, $Al_2O_3$, $TiO_2$, $ZrO_2$, MgO, $Li_7La_3Zr_2O_{12}$, $Li_{6.4}La_3Zr_{1.4}Ta_{0.6}O_{12}$, $Li_{10}GeP_2S_{12}$, $Li_{1.3}Al_{0.3}Ti_{1.7}(PO_4)_3$, $Li_{2.88}PO_{3.73}N_{0.14}$, montmorillonite, kaolin and diatomite. The inorganic filler can further improve the conductivity and strength of the polymer electrolyte, thereby improving the safety.

In the polymer electrolyte, the content of inorganic filler is 1-80 wt %.

The conductivity of the polymer electrolyte provided by the application reaches $10^{-3}$ orders of magnitude, which is high.

The application also provides a polymer battery, comprising a positive electrode, a negative electrode and a polymer electrolyte between the positive electrode and the negative electrode, wherein the electrolyte is the polymer electrolyte described above.

In the above polymer battery provided by the present invention, preferably, wherein the positive electrode comprises a positive electrode active material, and the positive electrode active material is at least one of $LiNi_xCo_y$ $MnzL_{(1-x-y-z)}O_2$, $LiCo_xL_{(1-x)}O_2$, $LiNi_{x'}L'_{y'}Mn_{(2-x''-y')}O_4$, $Li_zMPO_4$; in which L is at least one of Al, Sr, Mg, Ti, Ca, Zr, Zn, Si or Fe; 0≤x≤1, 0≤y≤1, 0≤z≤1, 0<x+y+z≤1, 0<x'≤1, 0.3≤x''≤0.6, 0.01≤y'≤0.2; L' is at least one of Co, Al, Sr, Mg, Ti, Ca, Zr, Zn, Si or Fe; 0.5≤z'≤1, M is at least one of Fe, Mn or Co. Specifically, the positive electrode active material is selected from one or more of lithium cobaltate, nickel cobalt aluminum, nickel cobalt manganese, lithium iron manganese phosphate, lithium manganate and lithium iron phosphate.

The negative electrode comprises one or more of lithium metal, graphite and silicon-containing materials.

The present application will be further explained by the following embodiments.

Embodiment 1

This embodiment is used to illustrate the polymer electrolyte and polymer battery disclosed in the present application.

(1) Preparation of Polymer Electrolyte 1.0 g of polymer-1 with molecular weight of 1,000,000 and 1.63 g $LiN(SO_2CF_3)_2$ were added into 30 g of acetonitrile solution, stirred until completely dissolved, and the solution was cast into polytetrafluoroethylene template, volatilized at normal temperature for 4 h, and then dried in vacuum at 50° C. for 6 h to obtain a polymer electrolyte. The molar ratio of lithium ion to oxygen atom is calculated according to the following formula (when the molecular weight of polyether polymer is large enough, the weight ratio of terminal functional groups of polyether polymer is very low, which is negligible when calculating the molar ratio):

The molar ratio of lithium ions to oxygen atoms=$(m_2/M_{w2})/(m_1/M_{w1})$ $m_1$ is the mass of polyether polymer, $m_2$ is the mass of lithium salt, $M_{w1}$ is molecular weight of the repeating unit of polyether polymer and $M_{w2}$ is the molecular weight of lithium salt.

In this embodiment, the molar ratio is calculated as 1/4.

(2) Performance characterization of the polymer electrolyte:

Membrane thickness test: the thickness of five points on the polymer electrolyte membrane was measured by a thickness meter, and the average value was calculated.

Ion conductivity: stainless steel was selected as working electrode to assemble 2032 button cell. Electrochemical impedance spectroscopy is adopted to measure the impedance of polymer electrolyte, and the frequency range is 0.01 Hz~100 kHz. The ionic conductivity of polymer electrolyte is calculated by the formula $\sigma=D/RS$, where D is the thickness of polymer electrolyte, R is the impedance of polymer electrolyte obtained by AC impedance technique, and S is the area of polymer electrolyte.

Oxidative decomposition potential; Using platinum as working electrode and lithium sheet as working electrode and counter electrode to assemble 2032 button cell. The electrochemical window was measured by linear voltammetry scanning with an electrochemical workstation. The voltage range is from open-circuit voltage to 6.0V, and the scanning speed is 1 mV/s.

(3) Performance Test of Polymer Battery:

Preparation of positive electrode sheet: polyvinylidene fluoride (PVDF) was dissolved in N, N-methylpyrrolidone (NMP), positive electrode material of $LiFePO_4$, PVDF, conductive carbon black and the above polymer electrolyte were mixed according to the mass ratio of 83:4:3:10, and NMP was added and ground until the mixture was uniform. The above obtained slurry was uniformly coated on an aluminum foil, the thickness was 70-100 m, dried at 80° C., then vacuum-dried at 120° C.

Battery assembly: A lithium sheet with a thickness of about 35 m is selected as negative electrode. The 2032 button battery was assembled in the order of negative electrode shell-elastic sheet-spacer-lithium sheet-polymer electrolyte-positive electrode-spacer-positive electrode shell.

Battery charge and discharge performance test: the charge and discharge rate and cycle performance of the polymer battery were tested by Land Battery Test System. Cyclic performance was tested by the following methods: the battery was charged to 3.65V with 0.2 C constant current, then charged to until the current drops to 0.20 mA with constant voltage, and then discharged to 2.5V with 0.2 C constant current. In this way, after 100 cycles, the discharge capacity of the 1st cycle and the discharge capacity of the 100th cycle were recorded, and then the capacity retention rate of the battery cycle was calculated according to the formula: capacity retention rate=(the 100th cycle discharge capacity of/the 1st cycle discharge capacity)*100%. Rate performance was tested by the following method: the battery was charged to 3.65V with 0.1 C constant current, then charged to until the current drops to 0.20 mA with constant voltage, and then discharged to 2.5V with constant currents of 0.1 C, 0.2 C, 0.5 C, 1.0 C and 2.0 C. The battery was cycled for 5 cycles at each rate, and the discharge capacities at different rates were recorded.

Embodiment 2

This embodiment illustrates the polymer electrolyte and polymer battery disclosed in the present application.

Except that the molar ratio of lithium ions to oxygen atoms in the polymer electrolyte was adjusted to 1/2, the others was same as Embodiment 1.

Embodiment 3

This embodiment illustrates the polymer electrolyte and polymer battery disclosed in the present application.

Except that the molar ratio of lithium ions to oxygen atoms in the polymer electrolyte was adjusted to 1/1, the others was same as Embodiment 1.

Embodiment 4

This embodiment illustrates the polymer electrolyte and polymer battery disclosed in the present application.

Except that the molar ratio of lithium ions to oxygen atoms in the polymer electrolyte was adjusted to 2/1, the others was same as Embodiment 1.

Embodiment 5

This embodiment illustrates the polymer electrolyte and polymer battery disclosed in the present application.

Except that the lithium salt in polymer electrolyte was changed to $LiPF_6$, the others was same as Embodiment 1.

Embodiment 6

This embodiment illustrates the polymer electrolyte and polymer battery disclosed in the present application.

Except that the lithium salt in polymer electrolyte was changed to $LiN(SO_2F)_2$, the others was same as Embodiment 1.

Embodiment 7

This embodiment illustrates the polymer electrolyte and polymer battery disclosed in the present application.

Except that the polyether polymer in polymer electrolyte was polymer-2, the others was same as Embodiment 1.

Embodiment 8

This embodiment illustrates the polymer electrolyte and polymer battery disclosed in the present application.

Except that the molar ratio of lithium ions to oxygen atoms in the polymer electrolyte was adjusted to 1/2, the others was same as Embodiment 7.

Embodiment 9

This embodiment illustrates the polymer electrolyte and polymer battery disclosed in the present application.

Except that the polyether polymer in polymer electrolyte was polymer-4, the others was same as Embodiment 1.

Embodiment 10

This embodiment illustrates the polymer electrolyte and polymer battery disclosed in the present application.

Except that the polyether polymer in polymer electrolyte was polymer-5, the others was same as Embodiment 1.

Embodiment 11

This embodiment illustrates the polymer electrolyte and polymer battery disclosed in the present application.

Except that the polyether polymer in polymer electrolyte was polymer-6, the others was same as Embodiment 1.

Embodiment 12

This embodiment illustrates the polymer electrolyte and polymer battery disclosed in the present application.

Except that the polyether polymer in polymer electrolyte was polymer-7, 0.05 wt % BPO was added into the solution, and crosslinking was carried out at 80° C. after film casting, the others was same as Embodiment 1.

Embodiment 13

This embodiment illustrates the polymer electrolyte and polymer battery disclosed in the present application.

Except that the polyether polymer in polymer electrolyte was polymer-12, the others was same as Embodiment 1.

Embodiment 14

This embodiment illustrates the polymer electrolyte and polymer battery disclosed in the present application.

Except that the polyether polymer in polymer electrolyte was polymer-27, the others was same as Embodiment 1.

Embodiment 15

This embodiment illustrates the polymer electrolyte and polymer battery disclosed in the present application.

Except that the polyether polymer in polymer electrolyte was polymer-18, the others was same as Embodiment 1.

Embodiment 16

This embodiment illustrates the polymer electrolyte and polymer battery disclosed in the present application.

Except that the polyether polymer in polymer electrolyte was polymer-23, the others was same as Embodiment 1.

Embodiment 17

This embodiment illustrates the polymer electrolyte and polymer battery disclosed in the present application.

Except that the inorganic filler $SiO_2$ was added to the polymer electrolyte in addition to polyether polymer and lithium salt, the others was same as Embodiment 10, and the content of $SiO_2$ in the polymer electrolyte was 10 wt %.

Embodiment 18

This embodiment illustrates the polymer electrolyte and polymer battery disclosed in the present application.

Except that the inorganic filler $Al_2O_3$ was added to the polymer electrolyte in addition to polyether polymer and lithium salt, the others was same as Embodiment 10, and the content of $Al_2O_3$ in the polymer electrolyte was 10 wt %.

Embodiment 19

This embodiment illustrates the polymer electrolyte and polymer battery disclosed in the present application.

Except that the inorganic filler $Li_7La_3Zr_2O_{12}$ was added to the polymer electrolyte in addition to polyether polymer and lithium salt, the others was same as Embodiment 10, and the content of $Li_7La_3Zr_2O_{12}$ in the polymer electrolyte was 10 wt %.

Embodiment 20

This embodiment illustrates the polymer electrolyte and polymer battery disclosed in the present application.

Except that the inorganic filler $SiO_2$ was added to the polymer electrolyte in addition to polyether polymer and lithium salt, the others was same as Embodiment 13, and the content of $SiO_2$ in the polymer electrolyte was 10 wt %.

Embodiment 21

This embodiment illustrates the polymer electrolyte and polymer battery disclosed in the present application.

Except that the inorganic filler $SiO_2$ was added to the polymer electrolyte in addition to polyether polymer and lithium salt, the others was same as Embodiment 16, and the content of $SiO_2$ in the polymer electrolyte was 10 wt %.

Embodiment 22

This embodiment illustrates the polymer electrolyte and polymer battery disclosed in the present application.

Except that the positive electrode of the battery was changed to $LiCoO_2$, the charge cut off voltage was 4.2V, and the discharge cut off voltage was 3.0V, the others was same as Embodiment 1.

Embodiment 23

This embodiment illustrates the polymer electrolyte and polymer battery disclosed in the present application.

Except that the positive electrode of the battery was changed to $LiCoO_2$, the charge cut off voltage was 4.2V, and the discharge cut off voltage was 3.0V, the others was same as Embodiment 10.

Embodiment 24

This embodiment illustrates the polymer electrolyte and polymer battery disclosed in the present application.

Except that the positive electrode of the battery was changed to $LiCoO_2$, the charge cut off voltage was 4.2V, and the discharge cut off voltage was 3.0V, the others was same as Embodiment 18.

Embodiment 25

This embodiment illustrates the polymer electrolyte and polymer battery disclosed in the present application.

Except that Si was selected as the negative electrode of the battery, and the composition of the electrode sheet is as follow, negative electrode material of Si: CMC: conductive carbon black: $LiN(SO_2CF_3)_2$=80:5:5:10 (mass ratio), the charge cut off voltage was 4.2V, and the discharge cut off voltage was 3.0V. The others was same as Embodiment 10.

Embodiment 26

This embodiment illustrates the polymer electrolyte and polymer battery disclosed in the present application.

Except that graphite was selected as the negative electrode of the battery, and the composition of the electrode sheet is as follow, negative electrode material of graphite: CMC: conductive carbon black: $LiN(SO_2CF_3)_2$=85:3:2:10 (mass ratio), the charge cut off voltage was 4.2V, and the discharge cut off voltage was 3.0V. The others was same as Embodiment 10.

Embodiment 27

This embodiment illustrates the polymer electrolyte and polymer battery disclosed in the present application.

Except that the positive electrode of the battery was changed to $LiNi_{0.5}Mn_{0.3}Co_{0.2}O_2$, the charge cut off voltage was 4.2V, and the discharge cut off voltage was 3.0V, the others was same as Embodiment 10.

Comparative Example 1

This embodiment illustrates the polymer electrolyte and polymer battery disclosed in the present application.

Except that the molar ratio of lithium ions to oxygen atoms in the polymer electrolyte was adjusted to 1/16, the others was same as Embodiment 1.

Comparative Example 2

This embodiment illustrates the polymer electrolyte and polymer battery disclosed in the present application.

Except that the polyether polymer in polymer electrolyte was linear polyethylene oxide, the others was same as Embodiment 1.

Comparative Example 3

This embodiment illustrates the polymer electrolyte and polymer battery disclosed in the present application.

Except that the molar ratio of lithium ions to oxygen atoms in the polymer electrolyte was adjusted to 1/16, the others was same as Embodiment 23.

Comparative Example 4

This embodiment illustrates the polymer electrolyte and polymer battery disclosed in the present application.

Except that the molar ratio of lithium ions to oxygen atoms in the polymer electrolyte was adjusted to 1/16, the others was same as Embodiment 25.

Comparative Example 5

This embodiment illustrates the polymer electrolyte and polymer battery disclosed in the present application.

Except that the molar ratio of lithium ions to oxygen atoms in the polymer electrolyte was adjusted to 1/16, the others was same as Embodiment 26.

Comparative Example 6

This embodiment illustrates the polymer electrolyte and polymer battery disclosed in the present application.

Except that the molar ratio of lithium ions to oxygen atoms in the polymer electrolyte was adjusted to 1/16, the others was same as Embodiment 27.

The above Embodiments 1-27 and Comparative Examples 1-6 can be referred to Table 2.

TABLE 2

| | Polyether Polymer | Lithium Salt | Molar Ratio of Lithium Ion to Oxygen Atom | Inorganic Filler | Positive Electrode Material | Negative Electrode Material |
|---|---|---|---|---|---|---|
| Embodiment 1 | Polymer-1 | $LiN(SO_2CF_3)_2$ | 1/4 | | $LiFePO_4$ | Li |
| Embodiment 2 | Polymer-1 | $LiN(SO_2CF_3)_2$ | 1/2 | | $LiFePO_4$ | Li |
| Embodiment 3 | Polymer-1 | $LiN(SO_2CF_3)_2$ | 1/1 | | $LiFePO_4$ | Li |
| Embodiment 4 | Polymer-1 | $LiN(SO_2CF_3)_2$ | 2/1 | | $LiFePO_4$ | Li |
| Embodiment 5 | Polymer-1 | $LiPF_6$ | 1/4 | | $LiFePO_4$ | Li |
| Embodiment 6 | Polymer-1 | $LiN(SO_2F)_2$ | 1/4 | | $LiFePO_4$ | Li |
| Embodiment 7 | Polymer-2 | $LiN(SO_2CF_3)_2$ | 1/4 | | $LiFePO_4$ | Li |
| Embodiment 8 | Polymer-2 | $LiN(SO_2CF_3)_2$ | 1/2 | | $LiFePO_4$ | Li |
| Embodiment 9 | Polymer-4 | $LiN(SO_2CF_3)_2$ | 1/4 | | $LiFePO_4$ | Li |
| Embodiment 10 | Polymer-5 | $LiN(SO_2CF_3)_2$ | 1/4 | | $LiFePO_4$ | Li |
| Embodiment 11 | Polymer-6 | $LiN(SO_2CF_3)_2$ | 1/4 | | $LiFePO_4$ | Li |
| Embodiment 12 | Polymer-7 | $LiN(SO_2CF_3)_2$ | 1/4 | | $LiFePO_4$ | Li |
| Embodiment 13 | Polymer-12 | $LiN(SO_2CF_3)_2$ | 1/4 | | $LiFePO_4$ | Li |
| Embodiment 14 | Polymer-27 | $LiN(SO_2CF_3)_2$ | 1/4 | | $LiFePO_4$ | Li |
| Embodiment 15 | Polymer-18 | $LiN(SO_2CF_3)_2$ | 1/4 | | $LiFePO_4$ | Li |
| Embodiment 16 | Polymer-23 | $LiN(SO_2CF_3)_2$ | 1/4 | | $LiFePO_4$ | Li |
| Embodiment 17 | Polymer-5 | $LiN(SO_2CF_3)_2$ | 1/4 | $SiO_2$ | $LiFePO_4$ | Li |
| Embodiment 18 | Polymer-5 | $LiN(SO_2CF_3)_2$ | 1/4 | $Al_2O_3$ | $LiFePO_4$ | Li |
| Embodiment 19 | Polymer-5 | $LiN(SO_2CF_3)_2$ | 1/4 | $Li_7La_3Zr_2O_{12}$ | $LiFePO_4$ | Li |
| Embodiment 20 | Polymer-12 | $LiN(SO_2CF_3)_2$ | 1/4 | $SiO_2$ | $LiFePO_4$ | Li |
| Embodiment 21 | Polymer-23 | $LiN(SO_2CF_3)_2$ | 1/4 | $SiO_2$ | $LiFePO_4$ | Li |
| Embodiment 22 | Polymer-1 | $LiN(SO_2CF_3)_2$ | 1/4 | | $LiCoO_2$ | Li |
| Embodiment 23 | Polymer-5 | $LiN(SO_2CF_3)_2$ | 1/4 | | $LiCoO_2$ | Li |
| Embodiment 24 | Polymer-5 | $LiN(SO_2CF_3)_2$ | 1/4 | $Al_2O_3$ | $LiCoO_2$ | Li |
| Embodiment 25 | Polymer-5 | $LiN(SO_2CF_3)_2$ | 1/4 | | $LiFePO_4$ | Si |
| Embodiment 26 | Polymer-5 | $LiN(SO_2CF_3)_2$ | 1/4 | | $LiFePO_4$ | Graphite |
| Embodiment 27 | Polymer-5 | $LiN(SO_2CF_3)_2$ | 1/4 | | $LiNi_{0.5}Mn_{0.3}Co_{0.2}O_2$ | Li |
| Comparative Example 1 | Polymer-1 | $LiN(SO_2CF_3)_2$ | 1/16 | | $LiFePO_4$ | Li |
| Comparative Example 2 | Linear polyethylene oxide | $LiN(SO_2CF_3)_2$ | 1/4 | | $LiFePO_4$ | Li |
| Comparative Example 3 | Polymer-5 | $LiN(SO_2CF_3)_2$ | 1/16 | | $LiCoO_2$ | Li |
| Comparative Example 4 | Polymer-5 | $LiN(SO_2CF_3)_2$ | 1/16 | | $LiFePO_4$ | Si |
| Comparative Example 5 | Polymer-5 | $LiN(SO_2CF_3)_2$ | 1/16 | | $LiFePO_4$ | Graphite |
| Comparative Example 6 | Polymer-5 | $LiN(SO_2CF_3)_2$ | 1/16 | | $LiNi_{0.5}Mn_{0.3}Co_{0.2}O_2$ | Li |

The results of ionic conductivity and oxidative decomposition potential are shown in Table 3 below.

TABLE 3

| Embodiment/Comparative Example | Conductivity/S cm$^{-1}$ at 25° C. | Oxidation Potential/V |
| --- | --- | --- |
| Embodiment 1 | 5.8 × 10$^{-4}$ | 5.1 |
| Embodiment 2 | 7.8 × 10$^{-4}$ | 5.2 |
| Embodiment 3 | 8.3 × 10$^{-4}$ | 5.3 |
| Embodiment 4 | 4.0 × 10$^{-4}$ | 5.2 |
| Embodiment 5 | 3.7 × 10$^{-4}$ | 5.3 |
| Embodiment 6 | 7.2 × 10$^{-4}$ | 5.2 |
| Embodiment 7 | 7.6 × 10$^{-4}$ | 5.4 |
| Embodiment 8 | 7.7 × 10$^{-4}$ | 5.5 |
| Embodiment 9 | 2.6 × 10$^{-4}$ | 5.4 |
| Embodiment 10 | 7.4 × 10$^{-4}$ | 5.3 |
| Embodiment 11 | 6.3 × 10$^{-4}$ | 5.5 |
| Embodiment 12 | 8.1 × 10$^{-4}$ | 5.1 |
| Embodiment 13 | 7.3 × 10$^{-4}$ | 5.3 |
| Embodiment 14 | 7.5 × 10$^{-4}$ | 5.2 |
| Embodiment 15 | 7.0 × 10$^{-4}$ | 4.8 |
| Embodiment 16 | 6.9 × 10$^{-4}$ | 4.3 |
| Embodiment 17 | 8.7 × 10$^{-4}$ | 5.5 |
| Embodiment 18 | 9.1 × 10$^{-4}$ | 5.4 |
| Embodiment 19 | 9.6 × 10$^{-4}$ | 5.6 |
| Embodiment 20 | 8.3 × 10$^{-4}$ | 5.5 |
| Embodiment 21 | 4.5 × 10$^{-4}$ | 4.7 |
| Comparative Example 1 | 2.8 × 10$^{-6}$ | 4.3 |
| Comparative Example 2 | 1.2 × 10$^{-4}$ | 4.4 |

It can be seen from the test results of Comparative Example 1 and Embodiment 1 in Table 3 that when the molar ratio of lithium ion to oxygen atom increased from 1/16 to 1/4, the conductivity of polymer electrolyte increased from 2.8×10$^{-6}$ S cm$^{-1}$ to 5.8×10$^{-4}$ S cm$^{-1}$, and the oxidative decomposition potential increased from 4.3V to over 5.1V, indicating that the conductivity and oxidative decomposition potential of polymer electrolyte could be obviously improved when the molar ratio of lithium ion to oxygen atom reached 1/4. Furthermore, comparing the results of Embodiment 1 and Embodiment 4, it can be seen that when the molar ratio of lithium ion to oxygen atom increased to 2/1, the conductivity decreased to 4.0×10$^{-4}$ S cm$^{-1}$. It shows that excessive lithium salt will precipitate in polymer, which leads to phase separation and deteriorate the performance of polymer electrolyte.

Comparing Embodiment 1 and Embodiment 9, it can be seen that the conductivity of polymer electrolyte decreased from 5.8×10$^{-4}$ S cm$^{-1}$ to 2.6×10$^{-4}$ S cm$^{-1}$ when the average number of carbon atoms in the repeating units of polymer increased from 2 to 5, indicating that the average number of carbon atoms in all repeating units increased, the proportion of ether-oxygen functional groups in polymer decreased, the possibility of complexing with lithium ions to form ion transmission channels decreased, and the conductivity of polymer electrolyte decreased. Meanwhile, comparing the test results of Embodiments 7, 10 and 11, it can be seen that with the increase of the average number of carbon atoms in the repeating units of polyether polymer, the conductivity of polymer electrolyte decreased.

Comparing the results of Embodiment 10 with Embodiments 17, 18 and 19, it can be seen that by adding inorganic fillers SiO$_2$, Al$_2$O$_3$ and Li$_7$La$_3$Zr$_2$O$_{12}$ into the polymer electrolyte, the conductivity of polymer electrolyte can increase from 7.4×10$^{-4}$ S cm$^{-1}$ to 8.7×10$^{-4}$ S cm$^{-1}$, 9.1×10$^{-4}$ S cm$^{-1}$ and 9.6×10$^{-4}$ S cm$^{-1}$, respectively. The Li$_7$La$_3$Zr$_2$O$_{12}$ has high ionic conductivity itself, which is very beneficial to the formation of ion transmission channel and can obviously improve the ionic conductivity.

Comparing the results of Embodiment 1 and Embodiment 10, it can be seen that the conductivity of polymer electrolyte with copolymers of two different structural units increased from 5.8×10$^{-4}$ S cm$^{-1}$ to 7.4×10$^{-4}$ S cm$^{-1}$, indicating that copolymerization was beneficial to inhibit polymer crystallization, thus improving polymer conductivity.

Comparing the results of Embodiment 10 and Embodiment 12, it can be seen that the conductivity of polymer electrolyte with unsaturated bonds introduced into the terminal group and crosslinked increased from 7.4×10$^{-4}$ S cm$^{-1}$ to 8.1×10$^{-4}$ S cm$^{-1}$, indicating that the unsaturated bonds polymerized to form comb-like or network-like polymer, which can inhibit the crystallization of polymer and the polymer electrolyte has higher conductivity.

Comparing the results of Embodiment 16 and Embodiment 13, it can be seen that when polyether polymer adopted linear structure, the conductivity of polymer electrolyte was 6.9×10$^{-4}$ S cm$^{-1}$, and when branched structure was adopted, the conductivity of polymer electrolyte increased to 7.3×10$^{-4}$ S cm$^{-1}$, indicating that branched structure was beneficial to inhibit polymer crystallization and improve ionic conductivity.

The battery performance results are shown in Table 4 below.

TABLE 4

| Embodiment/Comparative Example | The 1st Discharge Capacity/mAh g$^{-1}$ at 45° C.@0.1 C | Rate Performance at 45° C. | | | | Capacity Retention Rate at 45° C.@0.2 C after 100 cycles |
| --- | --- | --- | --- | --- | --- | --- |
| | | 0.2 C/0.1 C | 0.5 C/0.1 C | 1.0 C/0.1 C | 2.0 C/0.1 C | |
| Embodiment 1 | 148.2 | 93.55% | 87.77% | 79.27% | 56.81% | 91.4% |
| Embodiment 2 | 149.9 | 94.28% | 89.03% | 80.03% | 57.29% | 92.6% |
| Embodiment 3 | 152 | 95.52% | 89.44% | 81.21% | 58.00% | 94.9% |
| Embodiment 4 | 145.2 | 93.53% | 79.45% | 74.11% | 49.51% | 85.4% |
| Embodiment 5 | 121.3 | 83.28% | 69.20% | 71.30% | 41.83% | 80.1% |
| Embodiment 6 | 154.9 | 94.73% | 89.69% | 81.25% | 60.37% | 94.6% |
| Embodiment 7 | 149.6 | 94.23% | 88.95% | 80.89% | 58.14% | 92.0% |
| Embodiment 8 | 150.9 | 94.86% | 89.25% | 81.68% | 60.29% | 93.1% |
| Embodiment 9 | 145.2 | 91.51% | 85.95% | 75.67% | 46.75% | 90.4% |
| Embodiment 10 | 148.7 | 94.83% | 88.25% | 80.54% | 57.42% | 91.8% |
| Embodiment 11 | 148.3 | 91.65% | 84.92% | 75.94% | 49.21% | 90.9% |
| Embodiment 12 | 149.2 | 95.47% | 89.17% | 79.47% | 59.23% | 91.4% |
| Embodiment 13 | 148.1 | 93.92% | 88.04% | 79.71% | 57.96% | 91.3% |
| Embodiment 14 | 149.0 | 93.47% | 87.01% | 77.61% | 54.96% | 91.7% |
| Embodiment 15 | 143.8 | 92.36% | 85.64% | 76.73% | 55.51% | 90.5% |
| Embodiment 16 | 142.8 | 92.58% | 87.15% | 75.40% | 53.89% | 89.0% |
| Embodiment 17 | 157.1 | 94.66% | 88.32% | 81.34% | 61.83% | 93.8% |

TABLE 4-continued

| Embodiment/ Comparative Example | The 1st Discharge Capacity/mAh g$^{-1}$ at 45° C.@0.1 C | Rate Performance at 45° C. | | | | Capacity Retention Rate at 45° C.@0.2 C after 100 cycles |
|---|---|---|---|---|---|---|
| | | 0.2 C/ 0.1 C | 0.5 C/ 0.1 C | 1.0 C/ 0.1 C | 2.0 C/ 0.1 C | |
| Embodiment 18 | 158.9 | 95.11% | 88.12% | 82.13% | 62.64% | 94.5% |
| Embodiment 19 | 159.1 | 95.82% | 88.60% | 82.42% | 65.85% | 95.4% |
| Embodiment 20 | 150.9 | 94.03% | 88.26% | 80.67% | 59.78% | 92.3% |
| Embodiment 21 | 147.9 | 93.76% | 88.23% | 80.09% | 59.06% | 91.1% |
| Embodiment 22 | 121.3 | 89.38% | 78.31% | 72.87% | 58.35% | 89.6% |
| Embodiment 23 | 130.1 | 91.71% | 85.75% | 77.86% | 57.39% | 89.3% |
| Embodiment 24 | 132.2 | 89.55% | 83.32% | 77.57% | 62.83% | 89.8% |
| Embodiment 25 | 137.9 | 90.53% | 81.45% | 74.11% | 50.51% | 81.3% |
| Embodiment 26 | 143.2 | 92.83% | 88.06% | 78.24% | 55.88% | 91.1% |
| Embodiment 27 | 137.2 | 80.21% | 70.32% | 62.31% | 43.52% | 83.5% |
| Comparative Example 1 | 139.3 | 90.30% | 85.81% | 70.83% | 40.42% | 71.9% |
| Comparative Example 2 | 143.9 | 93.08% | 85.81% | 75.32% | 54.50% | 90.1% |
| Comparative Example 3 | 103.2 | 90.33% | 84.19% | 71.95% | 40.12% | 59.9% |
| Comparative Example 4 | 130.4 | 80.47% | 71.37% | 60.32% | 35.24% | 49.0% |
| Comparative Example 5 | 98.4 | 79.93% | 70.97% | 65.77% | 41.40% | 54.2% |
| Comparative Example 6 | 128.4 | 70.03% | 61.19% | 49.34% | 23.31% | 40.2% |

Example 6

It can be seen from the battery performance results of Comparative Example 1 and Embodiment 1 in Table 4 that, when the molar ratio of lithium ion to oxygen atom increased from 1/16 to 1/4, the rate performance (2.0 C/0.1 C) of polymer battery increased from 40.42% to 56.81% at 45° C., and the capacity retention rate increased from 71.9% to 91.4% after 100 cycles, indicating that increasing the molar ratio of lithium ion to oxygen atom can obviously improve the cycle performance and rate performance of the battery, especially at high rate.

Comparing the results of Embodiment 1 and Embodiment 9, it can be seen that when the average number of carbon atoms in the repeating units of polyether polymer increased from 2 to 5, the rate performance of battery (2.0 C/0.1 C) decreases from 56.81% to 46.75% at 45° C., indicating that the average number of carbon atoms in all repeating units increased, the conductivity of polymer electrolyte decreased, and the rate performance of battery decreased. Meanwhile, comparing the test results of Embodiments 7, 10 and 11, it can be seen that with the increase of the average number of carbon atoms in the repeating units of polyether polymer, the rate performance and cycle performance of the battery decreased.

Comparing the results of Embodiment 10 with Embodiment 17, 18 and 19, it can be seen that when inorganic fillers $SiO_2$, $Al_2O_3$ and $Li_7La_3Zr_2O_{12}$ were added into polymer electrolyte respectively, the rate performance (2.0 C/0.1 C) of the battery increased from 57.42% to 61.83%, 62.64% and 65.85% respectively at 45° C., indicating that inorganic fillers were beneficial to improve the rate performance of the battery.

Comparing the results of Embodiment 1 and Embodiment 10, it can be seen that the rate performance (2.0 C/0.1 C) of batteries using copolymers of two different structural units increased from 56.81% to 57.42% at 45° C., indicating that copolymerization was beneficial to inhibit polymer crystallization and improve the rate performance of the batteries.

Comparing the results of Embodiment 10 and Embodiment 12, it can be seen that the rate performance (2.0 C/0.1 C) of polymer battery increases from 57.42% to 59.23% at 45° C., indicating that the terminal group of polymer contains unsaturated bonds and polymerization crosslinking can improve the rate performance of battery.

It can be seen from the results of Comparative Example 2 and Embodiment 1 that the rate performance (2.0 C/0.1 C) of polymer battery at 45° C. was 54.50% when the polyether polymer adopted linear structure, and the rate performance (2.0 C/0.1 C) of polymer battery increased to 56.81% when branched structure was adopted, indicating that branched structure had advantages in inhibiting polymer crystallization, improving ion conductivity and battery performance.

Comparing the results of Embodiment 23 and Comparative Example 3, it can be seen that, for battery with $LiCoO_2$ as positive active material and Li metal as negative material, when the molar ratio of lithium ion to oxygen atom increased from 1/16 to 1/4, the first discharge capacity of polymer battery increased from 103.2 mAhg$^{-1}$ to 130.1 mAhg$^{-1}$ at 0.1 C, 45° C., and the rate performance (2.0 C/0.1 C) increased from 40.12% to 57.39%, and the capacity retention rate increased from 59.9% to 89.3% after 100 cycles. Comparing the results of Embodiment 27 and Comparative Example 6, it can be seen that, for battery with $LiNi_{0.5}Mn_{0.3}Co_{0.2}O_2$ as positive active material and Li metal as negative material, the rate performance (2.0 C/0.1 C) of polymer battery at 45° C. increased from 23.31% to 43.52%, and the capacity retention rate increased from about 40.2% to 83.5% after 100 cycles, indicating that increasing the molar ratio of lithium ion to oxygen atom was beneficial to the transmission of lithium ion and improve the rate performance of battery. Moreover, a large number of oxygen atoms in polyether polymers were complexed with lithium ions, the decomposition voltage of polyether polymers was improved, therefore the polymer electrolyte had better voltage resistance and the cycle performance of battery was improved. In addition, the results were verified from similar results of battery with $LiFePO_4$ as positive electrode material and Si as negative electrode material (Comparing Embodiment 25 and Comparative Example 4) and battery with LiFePO$_4$ as positive electrode material and graphite as negative electrode material (Comparing Embodiment 26 and Comparative Example 5).

In this specification and the appended claims, the singular forms "a," "an," and "the" include plural reference, unless the context clearly dictates otherwise.

The invention claimed is:

1. A polymer electrolyte for lithium ion battery, comprising a polyether polymer and a lithium salt, wherein the molar ratio of lithium ions in the lithium salt to oxygen atoms in ether bonds of the polyether polymer is more than 1/4; the polyether polymer comprises a polymer represented by the following formula 1:

$$A\text{-}R_n;\quad\text{Formula 1:}$$

wherein, A is a hydrocarbyl group or an oxygen-containing hydrocarbyl group, n is an integer and n≥1; R is

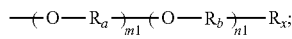

$R_a$ and $R_b$ are independently selected from alkylene; m1 is a natural number greater than 0, n1 is a natural number, and when n1 is 0, n≥3;

and the number of carbon atoms in $R_a$ is a', the number of carbon atoms in $R_b$ is b', (a'*m1+b'*n1)/(m1+n1)≤4;

$R_x$ is a hydroxyl group the lithium salt is selected from LiN(SO$_2$CF$_3$)$_2$.

2. The polymer electrolyte of claim 1, wherein the polyether polymer is selected from one or more of the following structural formulas:

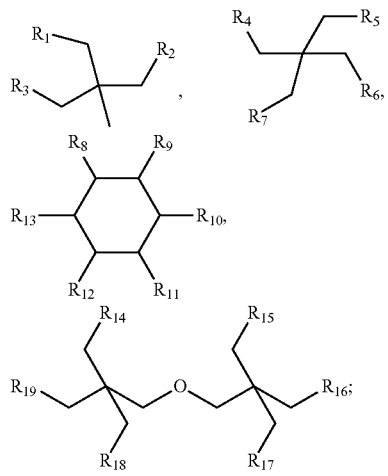

wherein, $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$ and $R_{17}$ are independently selected from

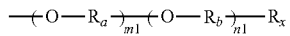

$R_a$ and $R_b$ are independently selected from alkylene; $R_x$ is a hydroxyl group; m1 is a natural number greater than 0, n1 is a natural number, and when n1 is 0, n≥3;

and the number of carbon atoms in $R_a$ is a', the number of carbon atoms in $R_b$ is b', (a'*m1+b'*n1)/(m1+n1)≤4.

3. The polymer electrolyte of claim 1, wherein $R_a$ and $R_b$ are selected from one of the following structural formulas:

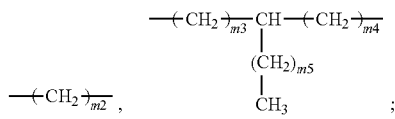

m2 is selected from natural numbers of 1-5, and m3, m4 and m5 are independently selected from natural numbers of 0-3.

4. The polymer electrolyte of claim 1, wherein the polymer electrolyte further comprises an inorganic filler.

5. The polymer electrolyte of claim 4, wherein the inorganic filler comprises one or more of SiO$_2$, Al$_2$O$_3$, TiO$_2$, ZrO$_2$, MgO, Li$_7$La$_3$Zr$_2$O$_{12}$, Li$_{6.4}$La$_3$Zr$_{1.4}$Ta$_{0.6}$O$_{12}$, Li$_{10}$GeP$_2$S$_{12}$, Li$_{1.3}$Al$_{0.3}$Ti$_{1.7}$(PO$_4$)$_3$, Li$_{2.88}$PO$_{3.73}$N$_{0.14}$, montmorillonite, kaolin and diatomite.

6. A polymer lithium ion battery, characterized by comprising a positive electrode, a negative electrode and a polymer electrolyte between the positive electrode and the negative electrode, wherein the polymer electrolyte is the polymer electrolyte of claim 1.

7. The polymer lithium ion battery of claim 6, wherein the positive electrode comprises a positive electrode active material, and the positive electrode active material is at least one of LiNi$_x$Co$_y$MnzL$_{(1-x-y-z)}$O$_2$, LiCo$_x$L$_{(1-x')}$O$_2$, LiNi$_{x'}$L'$_{y'}$Mn$_{(2-x''-y')}$O$_4$, Li$_{z'}$MPO$_4$; in which L is at least one of Al, Sr, Mg, Ti, Ca, Zr, Zn, Si or Fe; 0≤x≤1, 0≤y≤1, 0≤z≤1, 0<x+y+z≤1, 0<x'≤1, 0.3≤x''≤0.6, 0.01≤y'≤0.2; L' is at least one of Co, Al, Sr, Mg, Ti, Ca, Zr, Zn, Si or Fe; 0.5≤z'≤1, M is at least one of Fe, Mn or Co.

8. The polymer lithium ion battery of claim 6, wherein the negative electrode comprises one or more of lithium metal, graphite and silicon-containing materials.

* * * * *